United States Patent [19]

West

[11] 4,087,784
[45] May 2, 1978

[54] HAZARD SIGNAL, TURN SIGNAL, AND BRAKE SIGNAL SYSTEM FOR AN AUTOMOTIVE VEHICLE

[76] Inventor: Joe O. West, P.O. Box 37, Reform, Ala. 35481

[21] Appl. No.: 672,882

[22] Filed: Apr. 2, 1976

[51] Int. Cl.² ............................................. B60Q 1/38
[52] U.S. Cl. .................... 340/66; 340/81 F
[58] Field of Search ............... 340/66, 67, 81 R, 81 F

[56] References Cited

U.S. PATENT DOCUMENTS

| | | | |
|---|---|---|---|
| 3,215,979 | 11/1965 | Ryan | 340/66 |
| 3,564,497 | 2/1971 | Gazzo | 340/66 |
| 3,601,795 | 8/1971 | Shimizu | 340/67 |
| 3,740,714 | 6/1973 | Ballou | 340/67 |

*Primary Examiner*—Donald J. Yusko
*Attorney, Agent, or Firm*—Berman, Aisenberg & Platt

[57] ABSTRACT

A new and improved hazard signal, turn signal, and brake signal system for an automotive vehicle which is characterized in that each of the foregoing signal indications may be provided independently and/or simultaneously without interfering with one another. In a preferred embodiment the system comprises eight two-filament light sources arranged in groups of two sources at each of the four normal corners of the vehicle. One of the light sources in each of the four units serve as either a hazard light or a turn signal light, depending on the desired mode of operation. An important feature resides in that simultaneous energization of the hazard signals, turn signals, and/or brake signals do not serve to override one another, but may be provided simultaneously as separate indications.

18 Claims, 8 Drawing Figures

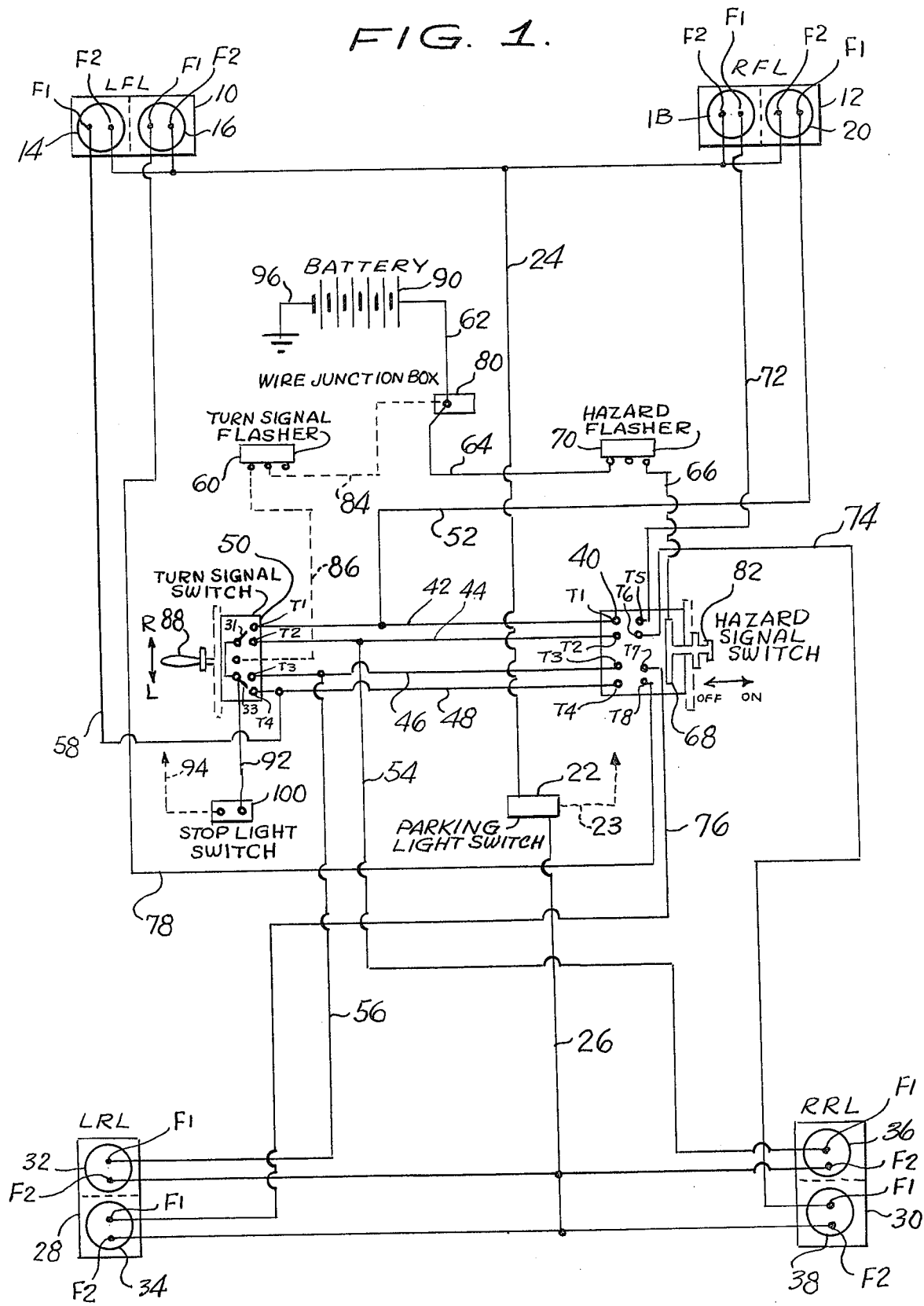

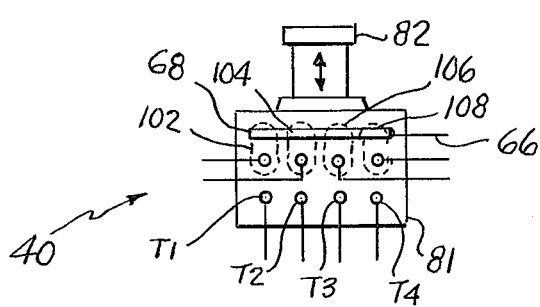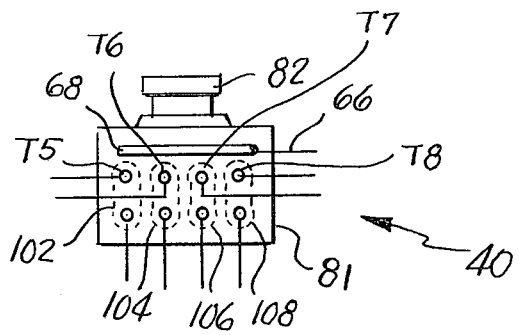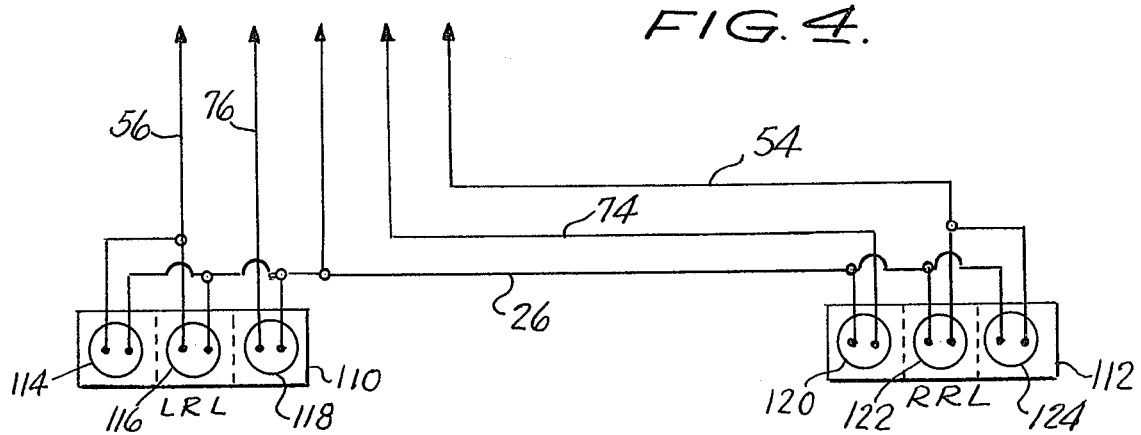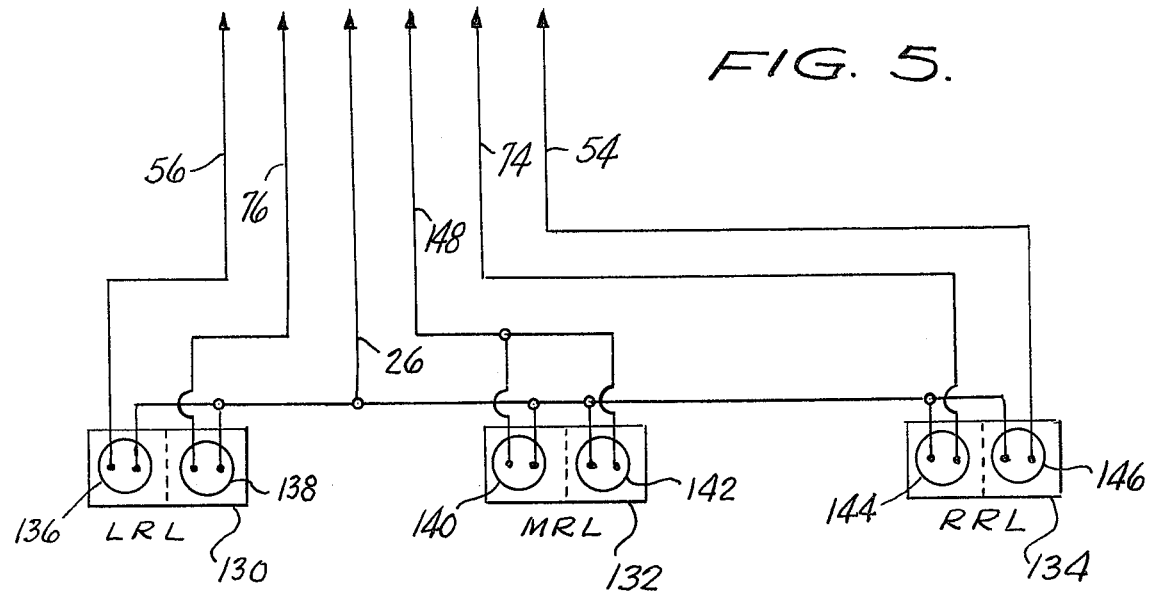

HAZARD SIGNAL, TURN SIGNAL, AND BRAKE SIGNAL SYSTEM FOR AN AUTOMOTIVE VEHICLE

BACKGROUND OF THE INVENTION

1. Field of the Invention

This invention is related to signaling systems for automotive vehicles and, more particularly, is directed towards a new and improved hazard signal, turn signal, and brake signal system for automotive vehicles and the like.

2. Description of the Prior Art

Many signaling systems have been promulgated which deal with the provision of satisfactory hazard signal lights, turn signals, and brake-like signals for automobiles. I am, in fact, aware of the following U.S. Pat. Nos. which deal either directly or remotely with the foregoing subject matter: 2,258,069; 2,659,838; 3,316,534; 3,340,503; 3,372,374; 3,464,061; 3,745,524; 3,832,680; 3,873,967; and 3,878,508.

Although it is apparent that many different systems proliferate in this art, it is just as equally clear to me that each suffers from one or more deficiencies which render the signaling systems at best unreliable and at worst unsafe.

For example, presently available automotive signaling systems do not provide separate indicators for hazard light flashing and turn signal light flashing, such that, if it were desirable to energize the two signaling indicators simultaneously, it would be impossible to distinguish therebetween. This would present a potentially hazardous situation if perchance a motorist, having turned on the hazard light indicators, would forget to turn them off and subsequently attempt to signal either a left or a right turn. Since, in such systems, the turn signal indicators are identical with the hazard light indicators, another motorist would find it impossible to tell if and when such a vehicle were signaling a turn.

Another potentially dangerous situation, which occurs so frequently in the presently utilized signaling systems, arises as a result of a brake light override of the hazard light indicators. That is to say, if a motorist has energized the hazard light flasher and subsequently applies the brakes to actuate the brake lights, the latter will override the flashing function of the hazard indicators to provide a steady output brake light indication. This is potentially hazardous if indeed it is desired to maintain the hazard lights in a flashing condition while applying the brakes, a situation which is impossible with presently available systems.

OBJECTS AND SUMMARY OF THE INVENTION

It is accordingly a primary object of the present invention to provide a new and improved hazard signal, turn signal, and brake signal indicator system by means of which each of the foregoing indicators may be energized simultaneously and/or independently without confusion and without causing one indicator to override another.

Another object of the present invention is to provide a hazard, turn, and brake light signal system for an automotive vehicle in which actuation of the brake lights do not override a hazard light flashing indication.

An additional object of the present invention is to provide a signaling system for an automotive vehicle by means of which a flashing turn signal indicator may be energized simultaneously with a flashing hazard signal indicator.

A still further object of the present invention is to provide an improved turn signal, hazard signal, and brake signal indicator system for automotive vehicles which permits unambiguous signaling of each of the foregoing functions simultaneously and/or independently, and which is adaptable to several different tail light configurations and designs.

Another object of the present invention is to provide a hazard signal, turn signal, and brake signal system for an automobile which decreases the likelihood of automobile accidents.

The foregoing and other objects are attained in accordance with one aspect of the present invention through the provision of a hazard signal, turn signal, and brake signal system for an automotive vehicle, which comprises at least eight light sources arranged in four units of two sources each. The four units are respectively disposed at the left front, right front, left rear and right rear of the automotive vehicle. Means are provided for controlling the energization of each of the eight light sources for providing independent and/or simultaneous indications of a hazard signal, a turn signal, and a brake signal.

The latter-mentioned control means, in accordance with another aspect of the present invention, preferably comprises a hazard signal switch which has both ON and OFF positions, and a hazard flasher which connects the vehicle's battery to the hazard signal switch. The hazard signal switch serves to intermittently energize one of the two light sources in each of the four units of light sources when in its ON position.

In accordance with another aspect of the present invention, the controlling means preferably comprises a turn signal switch having LEFT, RIGHT and OFF positions, and a turn signal flasher which connects the vehicle's battery to the turn signal switch. The turn signal switch serves to intermittently energize the other of the two light sources in the left front and left rear units when in its LEFT position, and serves to intermittently energize the other of the two light sources in the right front and right rear units when in its RIGHT position. The controlling means also preferably comprises a brake light switch having ON and OFF positions and which, when in its ON position, serves to steadily energize the other of the two light sources in the left rear and right rear units.

In accordance with yet another aspects of the present invention, the hazard signal switch is comprised of first and second sets of four terminals each, as well as a hot terminal which is connected to the hazard flasher for receiving electrical impulses therefrom. The hazard signal switch includes means for interconnecting the hot terminal with the first set of the four terminals when in its ON position, and for interconnecting the first set of four terminals with the second set of four terminals when in its OFF position. The four terminals in the first set are each respectively connected to one of the two light sources in each of the four units of sources.

In accordance with still further aspects of the present invention, the turn signal switch includes a single set of four terminals which are connected respectively to the other of the two light sources in each of the four units of light sources, as well as to the four terminals in the second set of terminals in the hazard signal switch. In the preferred embodiment, the interconnecting means of the hazard signal switch comprises four elongate electrically conductive pads which are movably positionable between the first and second set of terminals and the hot terminal.

In accordance with yet other aspects of the present invention, the signaling system further comprises at least four additional light sources, one of each being respectively associated with the four units of light sources, and a parking light switch which when actuated steadily energizes the four additional light sources. Further, four more light sources may be provided, one of each being respectively associated with the four units and being connected in parallel with the four additional light sources above-mentioned. In the preferred embodiment, the eight light sources, four additional light sources, and four more light sources are comprised of eight light bulbs each of which has two independently energizable filaments, each of the four units of light sources therefore being comprised of two of the eight light bulbs.

In other preferred embodiments, ninth and tenth, two-filament light bulbs may be provided, one of which may be disposed with the left rear bulb unit, the other of which may be disposed with the right rear unit. A first filament in each of the ninth and tenth bulbs is preferably connected to the parking light switch, while the second filament thereof is connected to the turn signal switch.

In accordance with yet another alternative embodiment of the present invention, ninth and tenth two-filament bulbs may be provided which together comprise a fifth light source unit preferably positioned intermediate the left and right rear units. The first filament of each of the ninth and tenth bulbs is preferably commonly connected to the parking light switch, the second filament of which is commonly connected to the brake light switch.

BRIEF DESCRIPTION OF THE DRAWINGS

The foregoing and other objects, aspects, uses and advantages of the present invention will be more fully appreciated as the same becomes better understood when considered in connection with the following detailed description of the present invention viewed in conjunction with the accompanying drawings, in which:

FIG. 1 is a schematic wiring diagram which illustrates a preferred embodiment of the hazard signal, turn signal, and brake signal system of the present invention;

FIG. 2 illustrates a preferred embodiment of a novel hazard signal switch in a first position utilized in the preferred embodiment illustrated in FIG. 1;

FIG. 3 depicts the same hazard signal switch as in FIG. 2 but in a second and alternative position;

FIG. 4 illustrates a partial schematic wiring diagram of an alternative embodiment of the present invention;

FIG. 5 is a partial schematic wiring diagram of yet another alternative embodiment of a hazard signal, turn signal, and brake signal system in accordance with the teachings of the present invention.

DETAILED DESCRIPTION OF THE PREFERRED EMBODIMENTS

Figure 6:
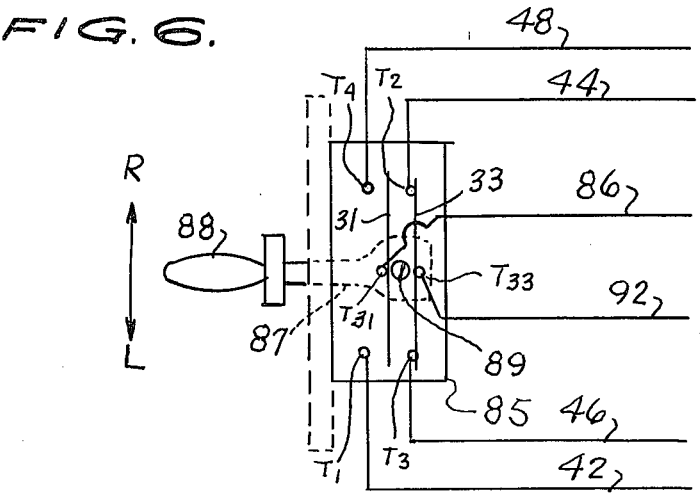
FIGS. 6, 7 and 8 illustrate the structure of a typical turn signal switch in its off, left turn, and right turn modes, respectively, which may be utilized in the preferred embodiment of the invention illustrated in FIG. 1.

Referring now to the drawings, wherein like reference numerals represent identical or corresponding parts throughout the several views, and more particularly to FIG. 1, there is illustrated a part schematic, part block diagram depicting the component interconnections and wiring structure of a first preferred embodiment of the hazard signal, turn signal, and brake signal system for an automotive vehicle in accordance with the present invention.

The system comprises, in this illustrative embodiment, four units of light sources 10, 12, 28 and 30 which are positioned respectively at the left front, right front, left rear, and right rear of the vehicle.

The left front unit 10 is comprised of two individual light bulbs 14 and 16, each of which has a pair of individually energizable filaments F1 and F2. The right front light source unit 12 likewise comprises a pair of bulbs 18 and 20 each of which also has a pair of individually energizable filaments F1 and F2. In a like fashion, the left rear and right rear light units 28 and 30 each have a pair of bulbs 32, 34 and 36, 38, respectively, associated therewith, each of said bulbs having a pair of independently energizable filaments F1 and F2 associated therewith.

It should be understood that the horizontal orientation of the left front and right front bulb units 10 and 12, as well as the vertical orientation of the left rear and right rear bulb units 28 and 30, are for illustrative purposes only, and other suitable physical configurations of the bulbs are entirely within the scope of the present invention. Further, although the preferred embodiment illustrates a total of eight light bulbs, each having two individually energizable filaments for a total of sixteen light sources, it should be appreciated by a person skilled in the art that other bulb-filament combinations are within the spirit and scope of the present invention as more particularly defined by the appended claims.

The bulb units 10, 12, 28 and 30, and their associated individually energizable filaments F1 and F2, are designed to provide all of the necessary signal indications for hazard signals, turn signals, and brake signals, in an unambiguous, independent fashion, which will become more clear hereinafter. The two front light units 10 and 12 represent the common parking light units for the vehicle, while the two rear light units 28 and 30 represent the common taillights of a vehicle, the common headlights of the vehicle not being shown.

The preferred embodiment of FIG. 1 includes a parking light switch 22 having one wire 24 thereof connected in common to the F2 filament of each of the front unit bulbs 14, 16, 18 and 20, the energization of which represents the normal parking lights located in the front of the vehicle. A second lead wire 26 from the parking light switch 22 is connected to the F2 filaments of each of the rearwardly located bulbs 32, 34, 36 and 38 which represent the normal taillights of the vehicle. While leads 24 and 26 are shown connected to two filaments in each of the light units 10, 12, 28 and 30, it should be appreciated that connection thereof to one filament in each of said light units would serve a similar function. Lead 23 is shown schematically extending from parking light switch 22 to the battery 90 of the automobile.

The battery 90 has a ground lead 96 and a hot lead 62 connected to a wire junction box 80. Lead 84 connects wire junction box 80 to a turn signal flasher unit 60 which is in turn connected by lead 86 to the turn signal switch 50.

Also extending from wire junction box 80 is lead 64 which connects the latter to a hazard flasher unit 70 which in turn has a wire 66 extending therefrom to a hot terminal 68 of a novel hazard signal switch 40.

Turn signal switch 50 has the common actuating handle 88 associated therewith for indicating either a left turn or a right turn as indicated by the "L" and "R" at the end of the two-headed arrow adjacent handle 88. Turn signal switch 50 has a set of four terminals T1, T2, T3, and T4 associated therewith to which are respectively connected lead wires 42, 44, 46 and 48. Turn signal switch 50 also has a lead 92 extending from a stop light switch 100, the latter having a hot wire 94 connected to battery 90 schematically illustrated.

Hazard signal switch 40 has an ON-OFF handle 82, a hot terminal 68, and eight wire terminals T1, T2, T3, T4, T5, T6, T7 and T8, arranged in two groups of four terminals each, associated therewith. Terminals T1, T2, T3 and T4 are respectively connected to lead wires 42, 44, 46 and 48, while terminal T5 is connected to filament F1 of bulb 18 via lead wire 72, terminal T6 is connected to filament F1 of bulb 38 via lead wire 74, terminal T7 is connected to filament F1 of bulb 34 via lead wire 76, and terminal T8 is connected to filament F1 of bulb 16 via lead wire 78. It may therefore be appreciated that each of the terminals T5 through T8 are connected individually to a single filament in each of the four units of light sources 10, 12, 28 and 30 and serve as the hazard signal light sources when energized.

Lead wires 42, 44, 46 and 48 extend respectively between the terminals T1, T2, T3 and T4 of both turn signal switch 50 and hazard signal switch 40. Further, lead wire 52 connects lead wire 42 to filament F1 of bulb 20, lead wire 54 connects wire 44 to filament F1 of bulb 36, lead wire 56 connects wire 46 to filament F1 of bulb 32, and lead wire 58 connects wire 48 to filament F1 of bulb 14.

Referring now to FIGS. 2 and 3, the structure and operation of hazard signal switch 40 of FIG. 1 will be explained in more detail. The internal structure of hazard signal switch 40 includes four elongated electrically conductive preferably metallic pads 102, 104, 106, and 108, structurally interconnected so as to move as a unit in response to the manual actuation of handle 82 of switch 40. As viewed in FIG. 2, the hazard signal 40 is in its ON position with the knob 82 fully extended from the terminal casing 81. In this ON position, pads 102, 104, 106 and 108 serve to interconnect the first set of four terminals T5, T6, T7 and T8 of switch 40 to its hot terminal 68, terminals T1 through T4 remaining in an open circuit condition. The position of handle 82 of switch 40 in FIG. 3 illustrates the latter in its OFF position, pads 102, 104, 106 and 108 serving to interconnect the first set of four terminals T5 through T8 to the second set of four terminals T1 through T4. In this mode, the hot terminal 68 is open-circuited from the pads 102 through 108. The latter may be connected for lateral movement with handle 82 by any conventional means (not shown).

In operation, with the hazard signal switch in its OFF position (as in FIG. 3), it can be appreciated that, if a right turn signal is actuated by turn signal switch 50, each of the filaments F1 of bulbs 18, 20, 36 and 38 will be energized. If a left turn signal is actuated by turn signal switch 50, each of the filaments F1 of bulbs 14, 16, 32 and 34 will be energized in an intermittent fashion.

If, on the other hand, the hazard signal switch 40 is in its ON position (as indicated in FIG. 2), the filaments F1 of bulbs 18, 38, 34, and 16 will be intermittently energized by the pulses received from hazard flasher unit 70 and conveyed via wire 66, hot terminal 68, and terminals T5 through T8. If, during this condition, a left turn is indicated by turn signal switch 50, filaments F1 of bulbs 14 and 32 only will be actuated. Alternatively, if a right turn is indicated by turn signal switch 50 with hazard signal switch 40 in its ON condition, the turn will be indicated by the actuation of filaments F1 of bulbs 20 and 36. Energization of the hazard signal switch and turn signal switch simultaneously will provide no loss of information and, indeed, will convey the necessary turn signal information as desired.

With the hazard signal switch in its ON position (FIG. 2), and hence filaments F1 of bulbs 18, 38, 34, and 16 flashing, if the brake lights are applied by virtue of actuation of stop light switch 100, filament F1 of bulbs 36 and 32 will be energized to indicate the braking action by closure of switches 31 and 33 in turn signal unit 50 to connect lead 92 to terminals T2 and T3. If, perchance, the turn signal switch 50 is also actuated such that filament F1 of either bulb 32 for a left turn or bulb 36 for a right turn is intermittently flashed under the control of turn signal flasher 60, the remaining filament F1 will still be available to indicate a stopping action of the vehicle upon the actuation of stop light switch 100.

Figure 7:
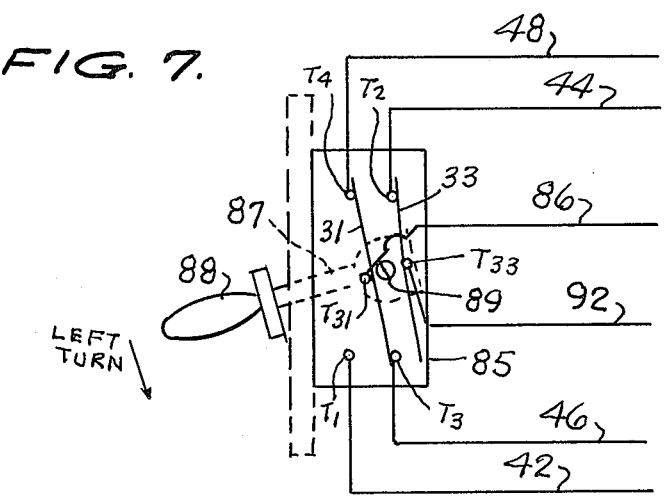
Figure 8:
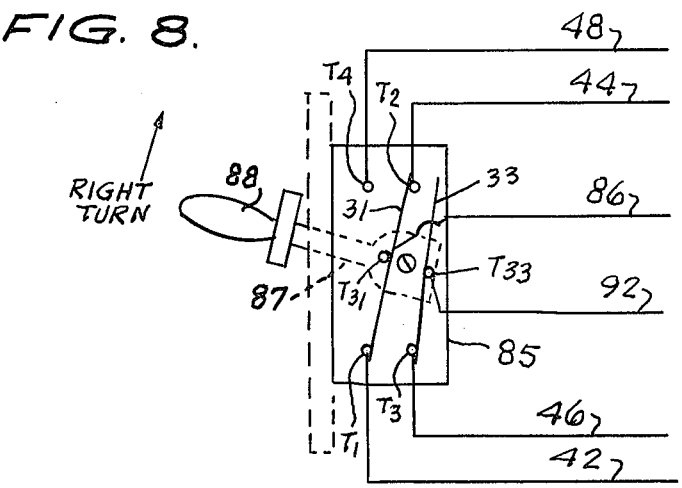

Referring now to FIG. 6, a typical embodiment of a turn signal switch 50 which may be utilized in the system of FIG. 1 is illustrated and is seen to include an actuating handle 88 which forms the extension of a plastic part 87 which is pivotally mounted as at 89 to a housing 85. Reference numerals 31 and 33 represent conducting blades which are utilized as the switching contacts for the turn signal switch 50. Blades 31 and 33 are mounted at their mid-portion to rotatable member 87 as indicated by terminals T31 and T33, respectively. Also connected to terminal T31 is line 86 which connects the turn signal flasher 60, while line 92 from the stop light switch 100 is connected to terminal T33. The condition of the terminals while making a left turn is illustrated in FIG. 7, and it is clear that terminals T3 and T4 are actuated by line 86 and contact blade 31 so as to cause filaments F1 of at least bulbs 32 and 14 to flash. If the brakes are applied while a left turn is being effected as in FIG. 7, line 92 actuates filament F1 of lamp 36 via line 44. FIG. 8 illustrates the condition of the turn signal switch 50 during a right turn whereupon contact blade 31 serves to actuate filaments F1 of at least bulbs 20 and 36 via terminals T1 and T2 and lines 42 and 44, respectively. If the stop light switch 100 is then actuated, terminal T3 and line 46 will serve to actuate filament F1 of lamp 32.

Referring now to FIG. 4, an alternative embodiment of the present invention is illustrated wherein the left rear bulb unit 110 and right rear bulb unit 112 are each comprised of three two-filament bulbs 114, 116, 118 and 120, 122, 124, respectively. This permits a pair of filaments in each unit 110 and 112 to always be utilized as the turn signal filament via leads 56 and 54, respectively, while the hazard flasher filament in bulbs 118 and 120 are still controlled via leads 76 and 74, respectively. It is noted that one filament in each of the bulbs 114 through 124 are in common connected to lead 26 for a tail light indication.

Referring now to FIG. 5, an additional and alternative embodiment is illustrated by means of which the rear of the vehicle is provided with a left tail light unit 130, a right tail light unit 134, and a center tail light unit 132, each being comprised of a pair of two-filament bulbs 136, 138, and 144, 146, and 140, 142, respectively. As in the previous embodiments, one filament from each of the bulbs 136 through 146 is connected in common via lead 26 as a tail light indicator. The remaining filaments in the left unit 130 and right unit 134 are connected identically to the embodiments illustrated in FIG. 1, while the two remaining filaments in the new center unit 132 are connected via lead 148 directly to the stop light switch 100 so as to provide an unambiguous brake light indication at all times.

Each of the embodiments of the present invention described heretofore provide unambiguous and non-interfering signal indications of both hazard conditions, braking conditions, and turn conditions, in a manner which will avoid ambiguities, mistakes, and accidents.

Obviously, numerous modifications and variations of the present invention are possible in light of the above teachings. It therefore should be understood that within the scope of the appended claims, the invention may be practiced otherwise than as specifically described herein.

I claim as my invention:

1. A hazard signal, turn signal, and brake signal system for an automotive vehicle, which comprises:
   a source of electrical energy;
   a plurality of light sources arranged in a plurality of units, said units being disposed in discrete locations about the exterior of said vehicle; and
   means for controlling the energization of each of said plurality of light sources for permitting simultaneous indications of a plurality of vehicle operation conditions;
   said vehicle operating conditions including a turning condition indicated by the flashing of at least two of said plurality of light sources located respectively at either the front left and rear left or the front right and rear right of said vehicle, a braking condition indicated by the steady actuation of at least one additional light source located at the rear of said vehicle, and a hazard condition indicated by the simultaneous flashing of at least four further light sources located respectively at front left, front right, rear left, and rear right positions on said exterior of said vehicle;
   said at least two of said plurality of light sources, said at least one additional light source and said at least four further light sources being independently actuable so as to permit simultaneous indications of said turning condition, said braking condition and said hazard condition.

2. The hazard signal, turn-signal, and brake signal system as set forth in claim 1, wherein said plurality of units include at least one unit comprising two of said plurality of light sources.

3. The hazard signal, turn-signal, and brake signal system as set forth in claim 1, wherein said plurality of units includes at least four units.

4. The hazard signal, turn-signal, and brake signal system as set forth in claim 3, wherein two of said four units are located in the front of said vehicle and two of said four units are located in the rear of said vehicle.

5. The hazard signal, turn-signal, and brake signal system as set forth in claim 4, wherein each of said four units are comprised of at least two light sources from said plurality of light sources.

6. The hazard signal, turn- signal, and brake signal system as set forth in claim 5, wherein said four units of light sources are respectively located at said left front, right front, left rear, and right rear position on said exterior of said vehicle.

7. The hazard signal, turn-signal, and brake signal system as set forth in claim 6, wherein said controlling means comprises a hazard signal switch having ON and OFF positions, a hazard flasher connecting said source of electrical energy to said hazard signal switch, said hazard signal switch serving to intermittently energize one of said two light sources in each of said four units of sources when in its ON position.

8. The hazard signal, turn-signal, and brake signal system as set forth in claim 7, wherein said controlling means further comprises a turn signal switch having LEFT, RIGHT and OFF positions, a turn signal flasher connecting said source of electrical energy to said turn signal switch, said turn signal switch serving to intermittently energize the other of said two light sources in said left front and left rear units when in said LEFT position and intermittently energize the other of said two right sources in said right front and right rear units when in said RIGHT position.

9. The hazard signal, turn-signal, and brake signal system as set forth in claim 8, wherein said controlling means further comprises a brake light switch having ON and OFF positions and which, when in the ON position, serves to steadily energize said other of said two light sources in said left rear and right rear units.

10. The hazard signal, turn-signal, and brake signal system as set forth in claim 9, wherein said hazard signal switch comprises first and second sets of four terminals and a hot terminal, said hot terminal connected to said hazard flasher for receiving electrical impulses therefrom, said hazard signal switch including means for interconnecting said hot terminal with said first set of four terminals when in its ON position and for interconnecting said first set of four terminals with said second set of four terminals when in its OFF position, said four terminals in said first set each being respectively connected to said one of said two light sources in each of said four units of sources.

11. The hazard signal, turn-signal, and brake signal system as set forth in claim 10, wherein said turn signal switch includes a single set of four terminals which are connected respectively to said other of said two light sources in each of said units of sources and to said four terminals in said second set of terminals in said hazard signal switch.

12. The hazard signal, turn-signal, and brake signal system as set forth in claim 11, wherein said interconnecting means of said hazard signal switch comprises four elongate electrically conductive pads movably positionable between said first and second set of terminals and said hot terminal.

13. The hazard signal, turn-signal, and brake signal system as set forth in claim 12, wherein said plurality of light sources further comprises at least four additional light sources one of each being respectively associated with said four units of light sources.

14. The hazard signal, turn-signal, and brake signal system as set forth in claim 13, further comprising a parking light switch which, when actuated, steadily energizes said four additional light sources.

15. The hazard signal, turn-signal, and brake signal system as set forth in claim 14, said plurality of light sources further comprising four more light sources one of each being respectively associated with said four units of light sources and being connected in parallel with said four additional light sources.

16. The hazard signal, turn-signal, and brake signal system as set forth in claim 15, wherein said plurality of light sources are comprised of eight light bulbs each having two independently energizable filaments, each of said four units of light sources being comprised of two of said eight light bulbs.

17. The hazard signal, turn-signal, and brake signal system as set forth in claim 16, further comprising ninth and tenth two-filament light bulbs one of which is disposed with said left rear unit, the other of which is disposed with said right rear unit, a first filament in each of said ninth and tenth bulbs being connected to said parking light switch, the second filament in said ninth and tenth bulbs being connected to said turn signal switch.

18. The hazard signal, turn-signal, and brake signal system as set forth in claim 16, further comprising ninth and tenth two-filament bulbs which together comprise a fifth light source unit located intermediate said left and right rear units, the first filament of each of said ninth and tenth bulbs being commonly connected to said parking light switch, the second filament of each of said ninth and tenth bulbs being commonly connected to said brake light switch.

* * * * *